US007073245B2

(12) United States Patent
Alexander et al.

(10) Patent No.: US 7,073,245 B2
(45) Date of Patent: Jul. 11, 2006

(54) MULTIPLE-WIRE TERMINATION TOOL WITH TRANSLATABLE JACK AND CUTTING BLADE PRECISION ALIGNMENT CARRIER

(75) Inventors: Paul John Alexander, Camarillo, CA (US); Michael M. Fallandy, Ventura, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 10/845,930

(22) Filed: May 14, 2004

(65) Prior Publication Data

US 2005/0251991 A1 Nov. 17, 2005

(51) Int. Cl.
*B23P 23/00* (2006.01)

(52) U.S. Cl. .................... 29/566.4; 29/566.1; 29/566.3

(58) Field of Classification Search ............... 29/566.4, 29/566.1, 566.3
See application file for complete search history.

(56) References Cited

U.S. PATENT DOCUMENTS 3,571,890 A * 3/1971 Brehm et al. .............. 29/566.4
4,044,451 A * 8/1977 Bunnell ...................... 29/566.4
4,429,451 A * 2/1984 Angelico ................... 29/566.4
4,467,516 A * 8/1984 John et al. ................. 29/566.4
4,480,374 A * 11/1984 Meyer ........................ 29/566.4
4,557,034 A * 12/1985 Pfundt ........................ 29/566.4
4,625,386 A * 12/1986 Bieganski .................. 29/566.4
4,627,150 A * 12/1986 Burnett ...................... 29/566.4
4,642,874 A * 2/1987 Litehizer, Jr. .............. 29/566.4
4,713,874 A * 12/1987 Schwartz ................... 29/566.4
4,862,580 A * 9/1989 Wang et al. ............... 29/566.4
5,109,591 A * 5/1992 Hung ......................... 29/566.4
5,214,842 A * 6/1993 Chen ........................... 29/749
5,830,003 A 11/1998 Sahlberg et al. ............ 439/392
5,832,603 A 11/1998 Fallandy ...................... 29/861
5,992,002 A * 11/1999 Hung ......................... 29/566.4
6,230,387 B1 * 5/2001 Gritters et al. ............. 29/566.4

OTHER PUBLICATIONS

Hubbell-Premise Wiring, Hubbell Incorporated (Delaware) 14 Lords' Hill Road, Stonington CT 06378, Hubbell-Premise Wiring Instruction Sheet, TX4p—1-Punch, 4-Pair Punch-Down Tool For Xcelerator™ Jacks, Oct. 15, 2002, Control No. 77359601, Rev. B, pp. 1-2.
TYCO Electronics Corporation, Harrisburg, PA, Tool Kit 1725150 for SL Series 110 Jack Connectors, Instruction Sheet 408-8858, Oct. 29, 2003, Rev. A, pp. 1-6.

* cited by examiner

*Primary Examiner*—Boyer D. Ashley
*Assistant Examiner*—Eric A. Gates
(74) *Attorney, Agent, or Firm*—Allen, Dyer, Doppelt, Milbrath & Gilchrist, P.A.

(57) ABSTRACT

A tool that seats and cuts multiple wires inserted into terminals of a multi-terminal jack includes a support housing for a linearly translatable, and removable carrier. The carrier fixedly retains one of a blade head and a jack, and slidably retains the other of the jack and the blade head, in such a manner that the jack is maintained in precision alignment with the blade head as the carrier is linearly translated within the support housing. A carrier translation control mechanism is coupled to the support housing in a manner that pushes and thereby linearly translates the carrier, so as to bring the blades of the translated blade head into precise stuffing and cutting engagement with the wires in the jack.

30 Claims, 10 Drawing Sheets

MULTIPLE-WIRE TERMINATION TOOL WITH TRANSLATABLE JACK AND CUTTING BLADE PRECISION ALIGNMENT CARRIER

FIELD OF THE INVENTION

The present invention relates in general to wire termination tools of the type employed in the telephone industry for stuffing or seating and cutting the free end of each of a plurality of wires inserted into resilient telephone wire terminal receptacles, such as but not limited to AT&T/Lucent Technologies, RJ-45/M-series type jacks. The invention is particularly directed to a new and improved pistol-grip type multi-wire stuffing and cutting tool, containing a replaceable, and linearly translatable blade head carrier, which is configured to precisely received and align a multi-wire termination jack with a multi-wire stuffing and cutting head, as the jack and cutting head are translated into wire-stuffing and cutting engagement with one another.

BACKGROUND OF THE INVENTION

The telephone industry currently offers its craftspersons a variety of wire termination tools for cutting and stuffing or seating individual telephone wires in telephone wire receptacles or jacks. Where the receptacle/jack is a relatively robust structure, such as a terminal block mounted to a telephone office mainframe, an impact tool used to seat and cut one wire at the time may be employed. Where the wire termination is not affixed to a relatively stable structure, as in the case of a relatively compact, reduced capacity telephone jack, such as the above-referenced RJ-45/M-series type jack, a description of which may be found in the U.S. patent to Sahlburg et al, U.S. Pat. No. 5,830,003 (hereinafter referred to as the '003 patent), for example, installing and cutting the wires by means of a multi-blade compression tool (such as an Anixter Part No. 139587), requires careful independent handling of a plurality of parts, in order to properly align the blades of the tool with the wire seating slots of the jack.

For example, if the cutting-head is not precisely aligned with the jack, a small amount of play between the tool may result. As a consequence, rather than cut a respective wire with the intended guillotine type of shearing/cutting action desired, the tool blade either deflects along the exterior of the wire's insulation jacket, or only slightly cuts into the jacket—bending the wire around the edge and then down along the side of the receptacle. The problem is exacerbated if the craftsperson fails to properly maintain alignment between the tool's cutting head and the jack as it is engaged by the jaws of the tool. If the wire-cutting head is tilted rather than being normal to the jack, for example, the blade may dig into the jack or may extend so far over an edge thereof, that the blade does nothing more than bend, rather than cut, the wire. Any wires that remain uncut must then be severed individually by the craftsperson by means of a separate wire cutter.

In accordance with the invention described in the U.S. patent to Fallandy, U.S. Pat. No. 5,832,603 (hereinafter referred to as the '603 patent), such cutting head/jack misalignment problems are addressed by a pistol-grip type of multi-wire seating and termination tool that is operative, as the user squeezes the tool's trigger, to translate a multi-blade cutting head carrier into linear alignment with the jack, so as to bring the blades of the cutting head into engagement with the wire insertion slots of the jack, and thereby cause the cutting head to reliably seat and cut the wires.

SUMMARY OF THE INVENTION

The present invention is directed to an improvement to the multi-wire stuffing and cutting tool generally of the type disclosed in the above-referenced '603 patent. In particular, the present invention is directed to a pistol-grip configured, multi-wire stuffing and cutting tool architecture that contains a linearly translatable blade head carrier, which is removably insertable into an associated support housing therefor. The blade head carrier contains a multi-blade wire-seating and cutting head and is configured to slidably retain therein a multi-terminal jack, in which respective wires of multi-wire cable have been inserted, such that the jack is maintained in precision alignment with the blade head, as the carrier is linearly translated within a support housing therefor.

Translation of the blade head carrier is effected by the user squeezing a trigger, which pushes and linearly translates the blade head carrier toward and against the jack, which is held in a fixed position by a backstop of the support housing, so as to bring the wire-seating and cutting blades of the translated blade head into precise wire-stuffing and cutting engagement with wires that have placed in the slots of the jack. The removability of the blade head carrier with respect to the support housing readily lends the invention to custom seating and cutting wires for different types of jacks. When operating on a different type of jack, the user simply removes upper portion of the support housing and then lifts the blade head carrier from the lower portion of the support housing and replaces it with a blade head carrier that contains a blade head that conforms with the different type of jack.

More particularly, the multi-blade cutting head is formed within a blade head retention cavity of a blade head carrier and includes a pair of wire-cutting blades and a set of wire-stuffing blades. Each blade of the blade head is rigidly retained in position in the blade head cavity by being molded into the plastic material of which the blade head carrier is formed. The wire-cutting blades are made of a durable cutting material such as hardened steel and the like, and are orthogonal to and abut opposite ends of a set of spaced apart wire-stuffing blades. Opposite sides of the wire-cutting blades are tapered to respective wire-severing knife edges.

The blade head carrier contains a pair of spaced apart, generally step-shaped sidewalls, that are connected to one another by a centrally located top wall, a generally U-shaped forward floor, a U-shaped rearward bottom wall and a back wall. The blade head retention cavity is formed at a generally central portion of the blade head carrier and is bounded by the carrier's sidewalls, top wall and back wall. Respective interior portions of the carrier's sidewalls are shaped to intimately conform with and guide the multi-wire termination jack into engagement with the blade head. This region of the blade head carrier further includes sidewall projections which cooperate with top wall projections to guide the jack into precision crimping engagement with the blade head.

Adjacent to the blade head retention cavity is a jack translation trough or recess which extends to a forward end of the blade carrier. The jack translation trough is sized to accommodate and provide for linear translation relative thereto of a multi-wire termination jack. Forwardmost ends of the sidewalls of the blade head carrier contain projections that receive compression springs which serve to bias the blade head carrier toward the rear/handle end of the tool, and thereby allow for the insertion of a multi-wire termination jack into the jack translation trough for the neutral position of the tool's trigger. In addition, biasing the blade head carrier toward the handle end of the tool serves to bias an associated trigger mechanism into an open position away from the tool's handle. Respective rearward regions of the carrier sidewalls have generally circular grooves and reinforcement tabs that are adapted to be engaged by the carrier translation dowel of a link member that is driven forward by the operation of the tool's trigger mechanism, as will be described.

The blade head carrier in slidably and removably retained within the bottom portion of a support housing. The support housing includes sidewalls which extend from a front wall of the housing to a rear end thereof. A jack backstop adjoins the sidewalls, and extends from the front wall to an opening between the sidewalls. The jack backstop is adapted to be engaged by the back side of and prevent translation of a multi-terminal jack, that has been placed in the jack translation trough of the blade head carrier, as the blade head carrier in which the jack has been installed is translated within the jack translation trough of the blade head carrier.

The lower support housing has a lower floor which adjoins the interior surfaces of the sidewalls. Adjacent to and vertically displaced from the lower floor is an upper floor, which adjoins rearward sidewall portions of the respective sidewalls. These floor portions are adapted to receive and provide lateral translation or sliding support for bottom surface portions of the generally step-shaped sidewalls of the blade head carrier. The rearward sidewall portions of the lower support housing have respective increased width dowel-guide portions which extend between partial circularly curved end portions at the rear end of the housing, and partial circularly curved end portions adjacent to a relatively forward end of the upper floor.

The upper portion of the support housing has a generally H-shaped configuration, comprising a pair of sidewalls, which generally conform with rearward sidewall portions of the bottom portion of the support housing. Interconnecting and contiguous with the top surfaces of the of sidewalls is an upper wall portion. Extending from and beneath upper wall portion is a generally cylindrical pedestal which is used to affix the upper portion of the support housing to the bottom portion of the support housing by way of the bore in the upper floor of the upper portion of the support housing.

Lower portions of the rearward sidewall portions of the upper support housing have respective increased width dowel-guide channels, which extend from partial circularly curved end portions at a forward end of the upper support housing to the rear end of the support housing. The dowel-guide portions of the upper support housing are located so that they overlie and cooperate with respective dowel-guide portions of the rearward sidewall portions of the lower support housing, to provide pair of dowel-guide channels on opposite sides of the support housing. In addition, the lengths of the dowel guide portions of the upper support housing are less than the lengths of the dowel-guide portions of the lower support housing, respectively, so as to leave a pair of gaps between the two support housings that provide for the entry of a pair of dowels associated with the operation of the trigger mechanism of the tool.

One of these dowels is retained by a link member that includes a pair of cylindrically configured and parallel end portions that are connected by body portion therebetween. One cylindrical end portion has a bore into which a dowel is press fit, while the other cylindrical end portion has a bore which is adapted to receive a pin that is sized to pass through a pair of associated coaxial bores in the tool's trigger mechanism, so as to pivotally interconnect the trigger with the link member. The dowel rides on the dowel-guide channels of the lower support housing and engages circular tab portions and grooves at the rear end of a blade head carrier that has been installed in the lower support housing.

When the trigger mechanism is operated to rotate the link member, the dowel pin will be urged against the rear surface of the blade head carrier, so that the blade head carrier will be laterally translated toward the front end of the support housing. Then, with a multi-terminal jack having been placed in the generally U-shaped jack translation trough at the forward end of the blade head carrier, the jack backstop will prevent translation of the jack proper, as the blade head carrier is pushed forward by the link member. This will allow the blade head to engage the jack, so as to stuff and cut the wires that have been placed in the slots of the jack's lead frame carrier.

The trigger comprises a generally longitudinal body a recess in an upper forward portion thereof, which contains a slot that is sized to accommodate a projection which extends from an upper portion of a generally longitudinal handle. The handle includes a trigger pivot bore that is sized to fit within the trigger's recess so that it may be coaxially aligned with a pair of pivot bores at the upper portion of the trigger on opposite sides of the recess. When aligned, the bores are adapted to receive a trigger pivot dowel, by way of which the trigger rotates relative to the handle. The upper portion of the trigger further includes additional bores which are adapted to be aligned with the bore in the cylindrical end portion of the link member. This allows a pin to pass through bores, thereby pivotally interconnecting the trigger with the link member.

To assemble the support housing with the trigger-handle mechanism, so that the tool is ready for used, the trigger assembly is first positioned adjacent to the support housing such that the dowel of the link member is adjacent to the gaps between the upper and lower portions of the support housing that lead to the dowel guide channels. Next, the link member dowel is inserted through these gaps so that it will ride in the support housing's dowel-guide channels. The trigger is then positioned so that its associated dowel is located immediately adjacent to the gaps of the support housing. The trigger dowel is then inserted into the dowel-guide channels so as to be captured against the partial circularly curved end portions at the rear end of the lower portion of the support housing by the rearward directed bias force imparted by the compression springs. With both dowels captured within the dowel-guide channels, squeezing the trigger will rotate the trigger toward the handle around the axis of trigger pivot dowel. This rotation, in turn, rotates the upper portion of the trigger and thereby its bores and the link member pivot pin therethrough in a forward direction toward the front end of the support housing. As a consequence, the dowel is caused to ride along handle projection and pushed forward along dowel-guide channels.

Since the link member dowel engages the rear end grooves in the blade head carrier, squeezing the trigger will result in a forward translation of the blade head carrier into crimping engagement with the jack that has been inserted into the jack translation trough at the forward end of the blade head carrier. Namely, squeezing the trigger causes the blade head to engage the jack, so as to stuff and cut the wires that have been placed in the slots of the jack's lead frame carrier, as intended.

Once the wires have been seated and cut, release of the trigger will allow compression springs to return the blade head carrier rearwardly along the support housing to its original position, so that the jack may be removed from the tool.

DETAILED DESCRIPTION

As pointed out briefly above, the multi-wire stuffing and cutting tool architecture of the present invention contains a translatable blade head carrier, which is configured to slidably retain therein a multi-terminal jack. For purposes of providing an illustrative application example, the invention will be described with respect to its ability to precisely seat and cut the wires of the above-referenced RJ-45/M-series type jack. It should be observed, however, that the invention is not limited to use with this or any particular type of multi-wire jack. The RJ-45/M-series type jack has been selected because of its widespread use, so that it is readily familiar to those skilled in the art.

Figure 1:
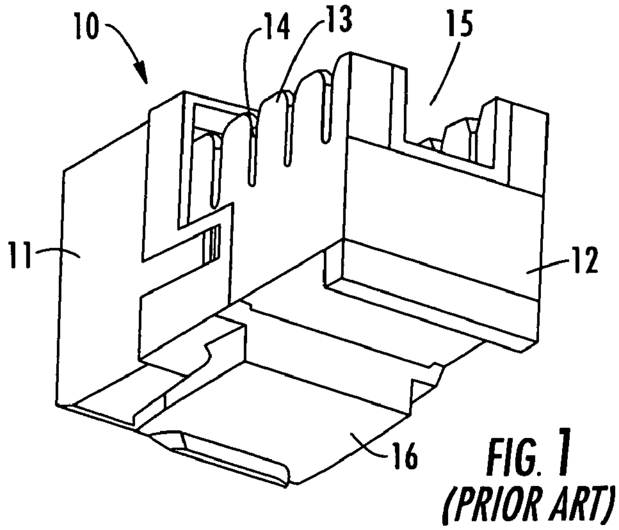
FIG. 1 (PRIOR ART)
FIG. 1 diagrammatically illustrates a multi-terminal jack of the type disclosed in the above-referenced '003 patent.

FIG. 1 diagrammatically illustrates such a jack 10 as comprising a generally rectangular shaped body 11, from which extends a lead frame carrier 12 having plurality of interleaved fingers 13 that are separated by wire-receiving slots 14, on either side of a generally longitudinal gap 15. A deflectable latch 16 is formed on the side of the jack opposite the finger/slot arrangement of the lead frame carrier, so as to provide for removable insertion of the jack into an associated support frame (not shown).

Figure 2:
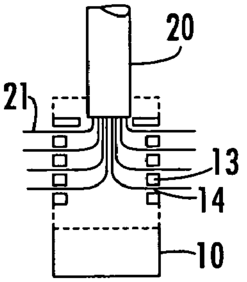
FIG. 2 (PRIOR ART)
FIG. 2 is a partial diagrammatic plan view of the multi-terminal jack of FIG. 1, showing the manner in which respective wires of a multi-wire communication cable are inserted into the slots of the jack.
Figure 3:
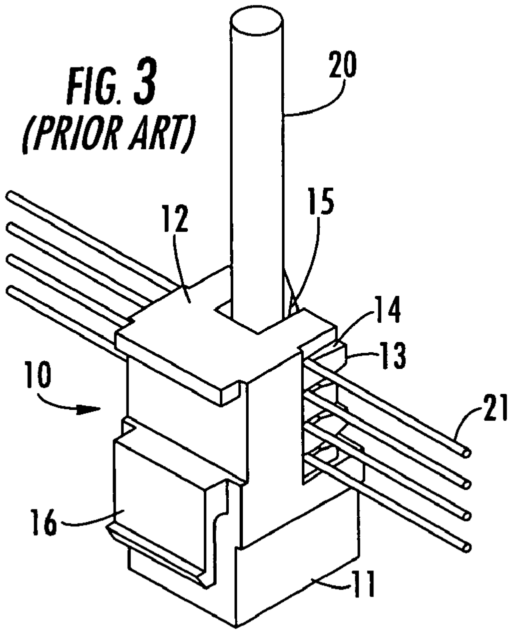
FIG. 3 (PRIOR ART)
FIG. 3 is a rear perspective view of the multi-terminal jack of FIG. 1, also showing respective wires of a multi-wire communication cable inserted into the slots of the jack.

The manner in which the respective wires of a multi-wire communication cable are inserted into the slots of the jack 10 is illustrated in the partial diagrammatic partial plan view of FIG. 2 and the perspective view of FIG. 3. As shown therein, the cable 20 is positioned along the gap 15, so that the respective wires 21 thereof may fan out from the cable and be inserted by the craftsperson into the slots 14 of the lead frame carrier. Once the wires have been inserted into the slots of the lead frame carrier, the jack is ready to be engaged by the blade head of the wire stuffing and cutting tool of the invention.

Figure 4:
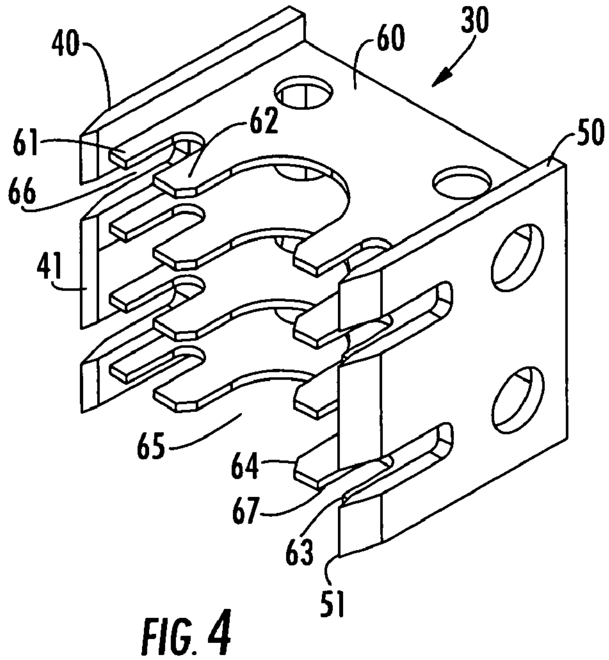
FIG. 4 is a perspective view of a blade head that is installed in the blade head carrier of the multi-wire seating and cutting tool of a first embodiment of the present invention.

The blade head, shown generally at 30 in the perspective view of FIG. 4, is formed within a blade head retention cavity of a blade head carrier (to be described below with reference to FIGS. 5–9). The blade head proper includes a pair of wire-cutting blades 40 and 50, and a set of wire-stuffing blades 60. Each of the blades is retained in position in the blade head cavity by being molded into the plastic material of which the blade head carrier is formed. The wire-cutting blades 40 and 50 are made of a durable cutting material such as hardened steel and the like, and are orthogonal to and abut opposite ends of a set of spaced apart wire-stuffing blades 60. Opposite sides of the blades 40 and 50 are tapered to respective wire-severing knife edges 41 and 51.

Each of the wire-stuffing blades 60, which may be made of a material such as beryllium copper and the like, has a spaced apart pair of wire-stuffing tines 61, 62 and 63, 64 on opposite sides of a generally centrally located slot 65. Tines 61 and 62 are separated by a slot 66 therebetween, while tines 63 and 64 are separated by a slot 67 therebetween. The slots 66 and 67 are sized to accommodate the slots 14 of the lead frame carrier 12 of a respective jack, described above. This provides clearance for the tines to push against and stuff portions of a respective insulated conductor on opposite sides of a slot of the jack's lead frame carrier, thereby seating that wire. The separation between the knife edges 41 and 51 of respective cutting blades 40 and 50 is such as to sever wires that have been seated or 'stuffed' into associated slots in the jack by the wire-stuffing blades just beyond opposite sides of the jack's lead frame.

Figure 5:
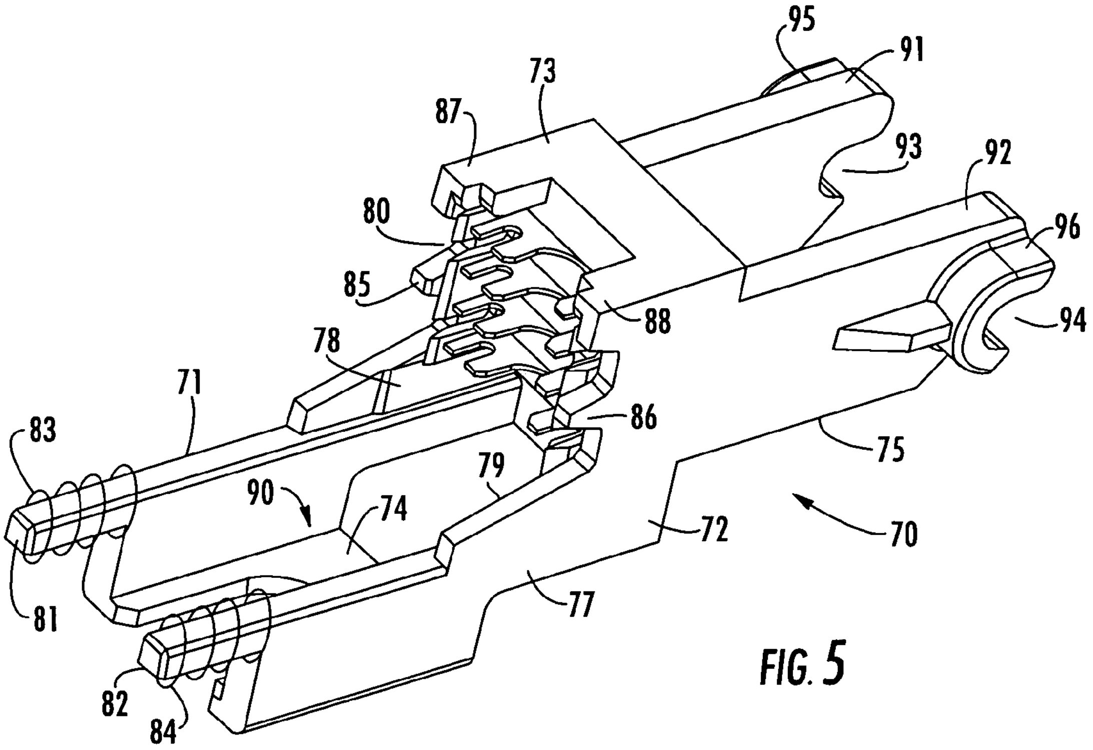
FIG. 5 is perspective view of a blade head carrier of the multi-wire seating and cutting tool of a first embodiment of the invention.
Figure 6:
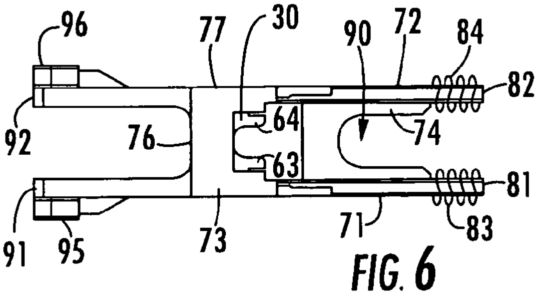
FIG. 6 is a top view of the blade head carrier of FIG. 5.
Figure 8:
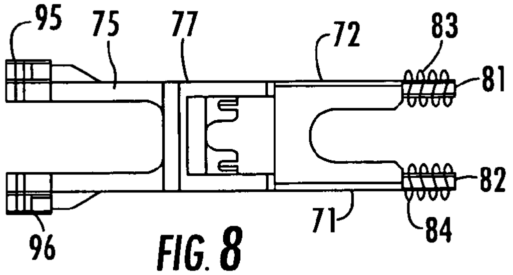
FIG. 8 is a bottom view of the blade head carrier of FIG. 5.
Figure 7:
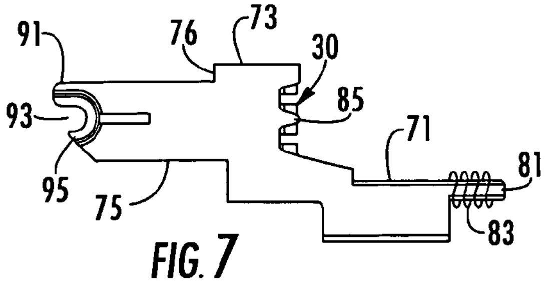
FIG. 7 is a side view of the blade head carrier of FIG. 5.
Figure 9:
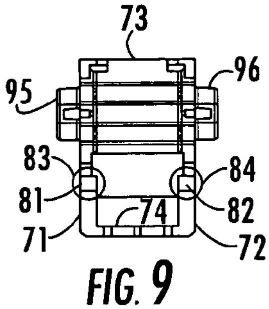
FIG. 9 is an end view of the blade head carrier of FIG. 5.
Figure 10:
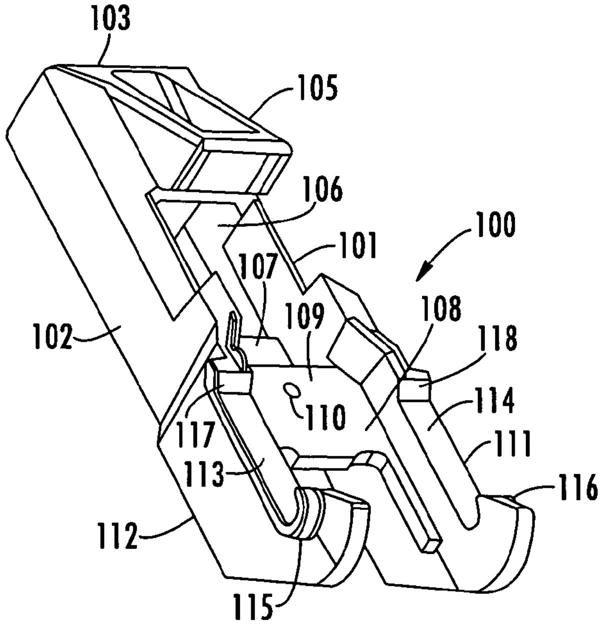
FIG. 10 is a rear perspective view of the bottom portion of a support housing of the multi-wire seating and cutting tool of the invention.
Figure 11:
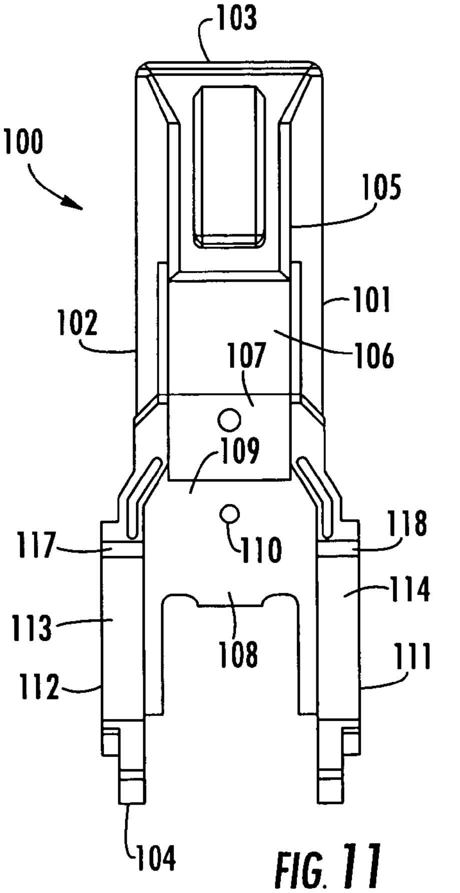
FIG. 11 is a top view of the bottom portion of the support housing shown in FIG. 10.
Figure 12:
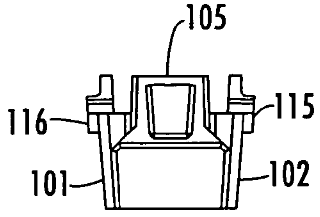
FIG. 12 is a front view of the bottom portion of the support housing shown in FIG. 10.
Figure 13:
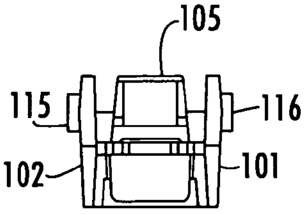
FIG. 13 is a back view of the bottom portion of the support housing shown in FIG. 10.
Figure 21:
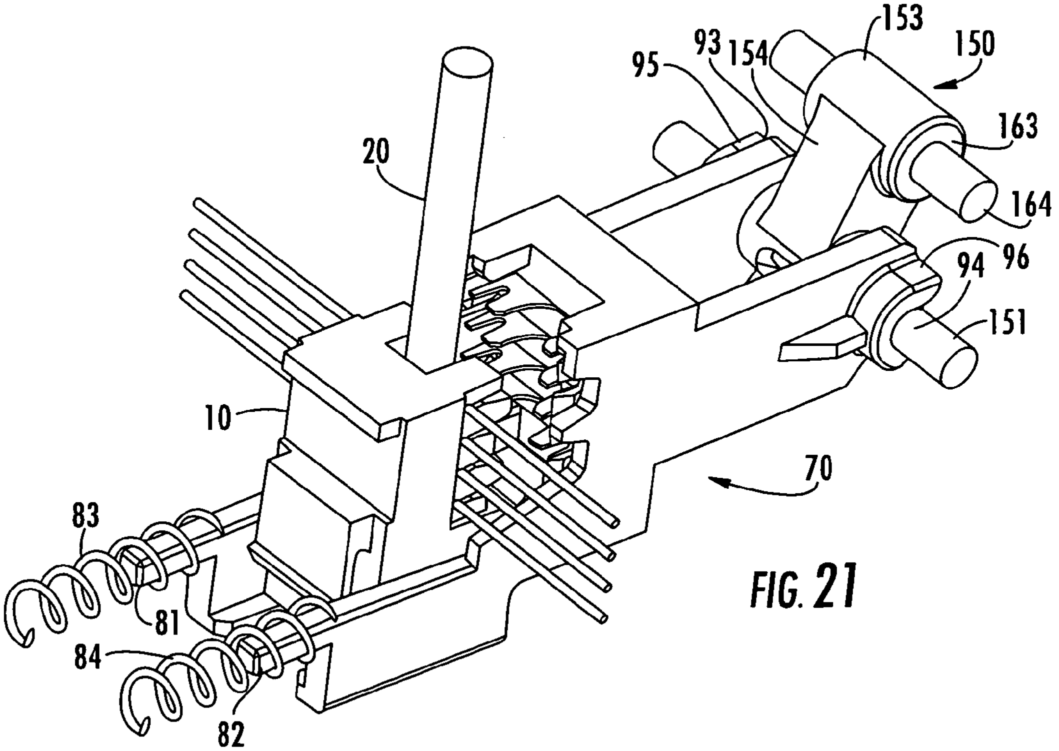
FIG. 21 shows the perspective partial assembly view of FIG. 19 with the first embodiment of the multi-termination jack installed in the blade carrier.

The blade head carrier is diagrammatically illustrated in the perspective view of FIG. 5, the top view of FIG. 6, the side view of FIG. 7, the bottom view of FIG. 8, and the end view of FIG. 9. As shown therein, the blade head carrier 70 is formed of a pair of spaced apart, generally step-shaped sidewalls 71 and 72, that are connected to one another by a centrally located top wall 73, a generally U-shaped forward floor 74, a generally U-shaped rearward bottom wall 75, and a back wall 76. The region bounded by sidewalls 71 and 72, top wall 73 and back wall 76 defines a blade head retention cavity 80 at a generally central region of the blade head carrier, while the region bounded by sidewalls 71 and 72 and the forward floor 74 defines a generally U-shaped jack translation trough 90 at a forward end of the blade carrier. The blade head retention cavity 80 is sized to fixedly retain therein the sets of wire-seating and cutting blades that form the blade head 30 shown in FIG. 4, described above. As shown in FIG. 21, to be described, the jack translation trough 90 is sized to accommodate and provide for linear translation relative thereto of a multi-wire termination jack of the type described above with reference to FIGS. 1–3.

As shown in FIG. 5 and also in FIGS. 6–9, 19 and 21, forwardmost ends of the sidewalls 71 and 72 have respective projections 81 and 82. These projections are sized to receive associated compression springs 83 and 84, which serve to bias the blade head carrier toward the rear/handle end of the tool, and thereby allow for the insertion of a multi-wire termination jack into the jack translation trough 90 for the neutral position of the tool's trigger. In addition, biasing the blade head carrier toward the handle end of the tool serves to bias an associated trigger mechanism (to be described) into an open position away from the tool's handle.

At a generally central portion 77 of the blade head carrier 70, adjacent to the blade head cavity 80 and the blade head 30 affixed therein, respective interior portions 78 and 79 of the sidewalls 71 and 72 are shaped to intimately conform with and intimately guide the multi-wire termination jack into engagement with the blade head. This region of the blade head carrier further includes sidewall projections 85 and 86, which cooperate with top wall projections 87 and 88 to guide the jack into precision crimping engagement with the blade head. This shaping of the interior portions of the sidewalls so as to intimately conform with the multi-wire termination jack serves to customize the blade head carrier for a specific type of jack, and is intended to prevent the craftsperson from using the blade head carrier with any jack other than the jack for which the blade head carrier is designed.

Respective rearward regions 91 and 92 of the carrier sidewalls 71 and 72 are beveled and have generally circular grooves 93 and 94; Adjacent to the respective grooves 93 and 94 are generally circular tab portions 95 and 96 which, along with the grooves 93 and 94, are adapted to be engaged by the carrier translation dowel of a link member (not shown in FIG. 5) that is driven forward by the operation of the tool's trigger mechanism, as will be described.

Attention is next directed to FIGS. 10, 11, 12 and 13, which are perspective, top, front and back views, respectively, of the bottom portion 100 of a support housing for the blade carrier 70 described above. As shown therein, the bottom portion 100 of the support housing includes sidewalls 101 and 102, which extend from a front wall 103 of the housing to a rear end 104 thereof. A jack backstop 105 adjoins the sidewalls, and extends from the front wall 103 to an opening 106 between the sidewalls. As will be described, the jack backstop 105 is adapted to be engaged by the back side of and prevent translation of a multi-terminal jack, that has been placed in the jack translation trough 90 of the blade head carrier 70, as the jack translation trough 90 in which the jack has been installed is translated along with the blade head carrier, as the blade head carrier 70 is pushed toward the lack backstop 105 by a link member 150 to be described.

Adjacent to opening 106 is a lower floor 107, which adjoins the interior surfaces of sidewalls 101 and 102. Adjacent to and vertically displaced from the lower floor 107 is an upper floor 108, which adjoins rearward sidewall portions 111 and 112 of respective sidewalls 101 and 102. The upper and lower floors are adapted to receive and provide lateral translation or sliding support for bottom surface portions of the generally step-shaped sidewalls 71 and 72 of the blade head carrier 70. The rearward sidewall portions 111 and 112 have respective increased width dowel-guide portions 113 and 114, which extend between partial circularly curved end portions 115 and 116 at the rear end 104 of the housing, and partial circularly curved end portions 117 and 118 adjacent to a relatively forward end 109 of the upper floor 108. A bore 110 is formed in the upper floor 108 and is adapted to receive a suitable fitting, such as a screw and the like, for affixing the upper portion of the support housing (to be described with reference to FIGS. 14–17) to the bottom portion of the support housing.

Figure 14:
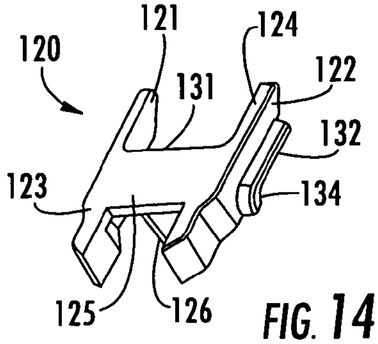
FIG. 14 is a perspective view of the upper portion of the support housing of the multi-wire seating and cutting tool of the invention.
Figure 15:
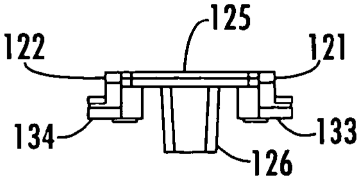
FIG. 15 is a rear view of the upper portion of the support housing shown in perspective in FIG. 14.
Figure 16:
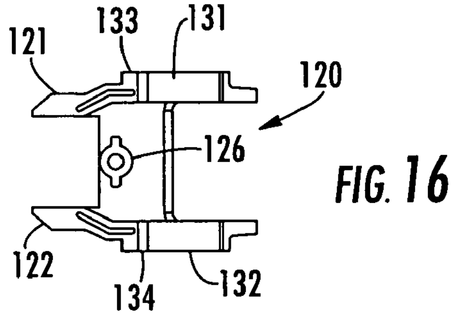
FIG. 16 is a bottom view of the upper portion of the support housing shown in perspective in FIG. 14.
Figure 17:
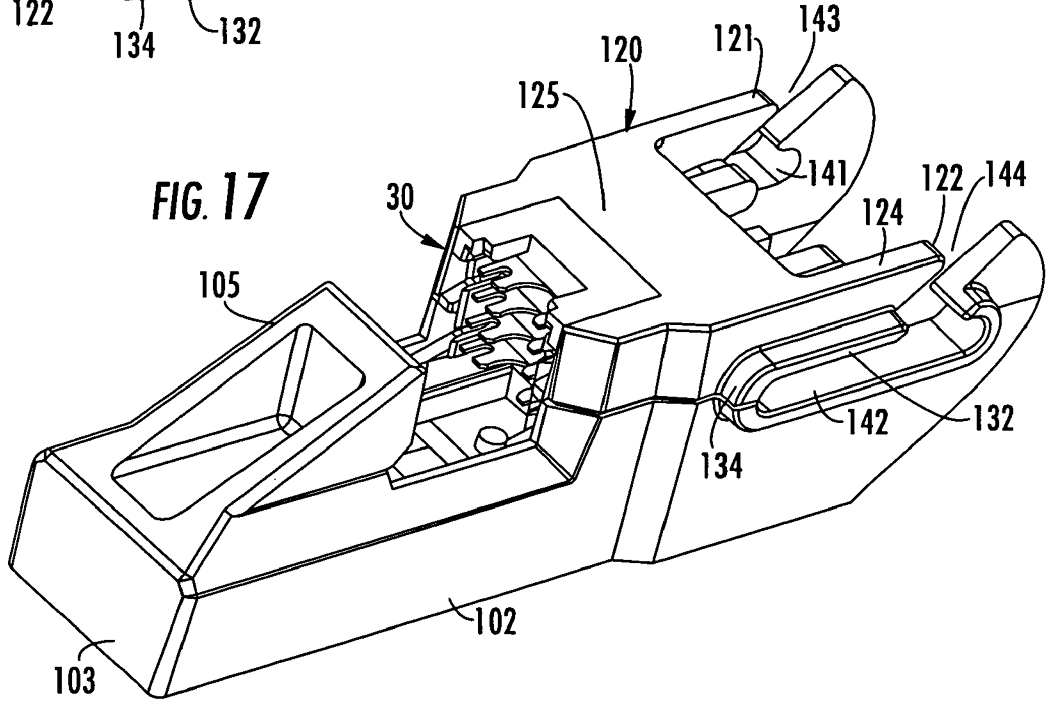
FIG. 17 is a perspective assembly view of the support housing with an installed blade carrier for the first embodiment of the multi-wire seating and cutting tool of the invention.

The upper portion of the support housing is shown in FIGS. 14, 15 and 16, which are respective perspective, rear and bottom views thereof. As shown therein, the upper portion 120 of the support housing has a generally H-shaped configuration, comprising a pair of sidewalls 121 and 122, which generally conform with rearward sidewall portions 111 and 112 of the bottom portion 100 of the support housing, described above. Interconnecting and contiguous with the top surfaces 123 and 124 of sidewalls 121 and 122, respectively, is an upper wall portion 125. Extending from and beneath upper wall portion 125 is a generally cylindrically configured pedestal 126, which is used to affix the upper portion 120 of the support housing to the bottom portion 100 of the support housing by way of the bore 110 in the upper floor 108 of the upper portion of the support housing, described above.

Lower portions of the rearward sidewall portions 111 and 112 of the upper portion 120 of the support housing have respective increased width dowel-guide portions 131 and 132, which extend from partial circularly curved end portions 133 and 134 at a forward end of the upper support housing to the rear end of the support housing. As shown in the assembly view of FIG. 17, dowel-guide portions 131 and 132 of the upper portion 120 of the support housing are located so that they overlie and cooperate with respective dowel-guide portions 113 and 114 of rearward sidewall portions 111 and 112 of the lower portion 100 of the support, housing, to provide a pair of dowel-guide channels 141 and 142 on opposite sides of the support housing. In addition, the lengths of dowel guide portions 131 and 132 of the upper support housing are less than the lengths of the dowel-guide portions 113 and 114 of the lower portion 100 of the support housing, respectively, so as to leave a pair of gaps 143 and 144 between the upper and lower portions 120 and 100, respectively, of the support housing that provide for the entry of a pair of dowels associated with the operation of the trigger mechanism of the tool, as will be described.

Figure 18:
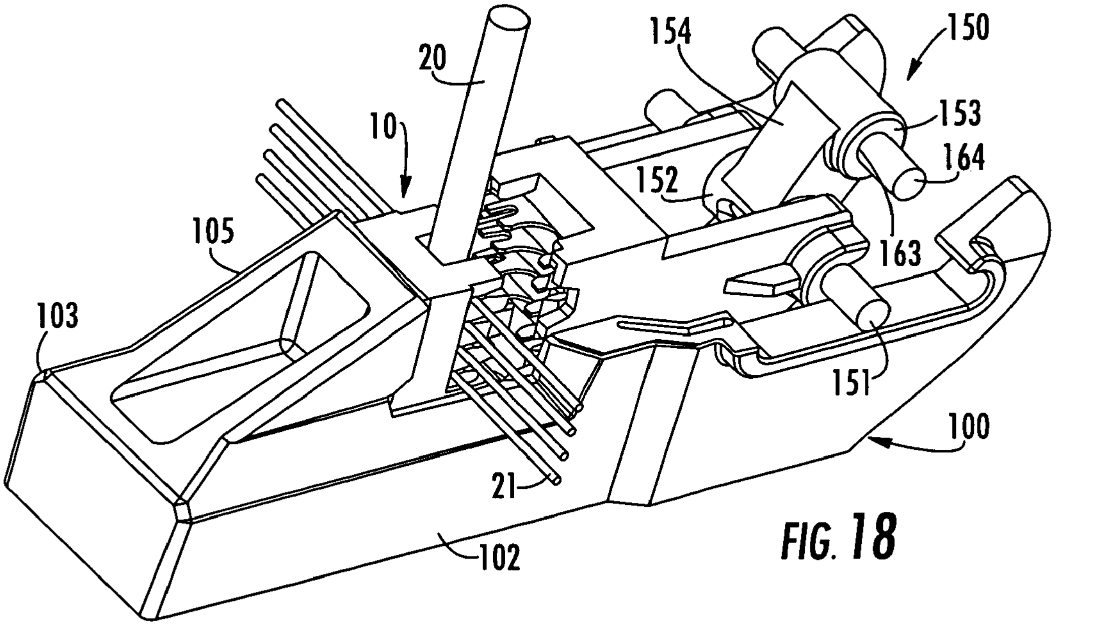
FIG. 18 is a perspective view showing the lower portion of the support housing with an installed blade carrier, multi-terminal jack and link member for the first embodiment of the multi-wire seating and cutting tool of the invention.
Figure 19:
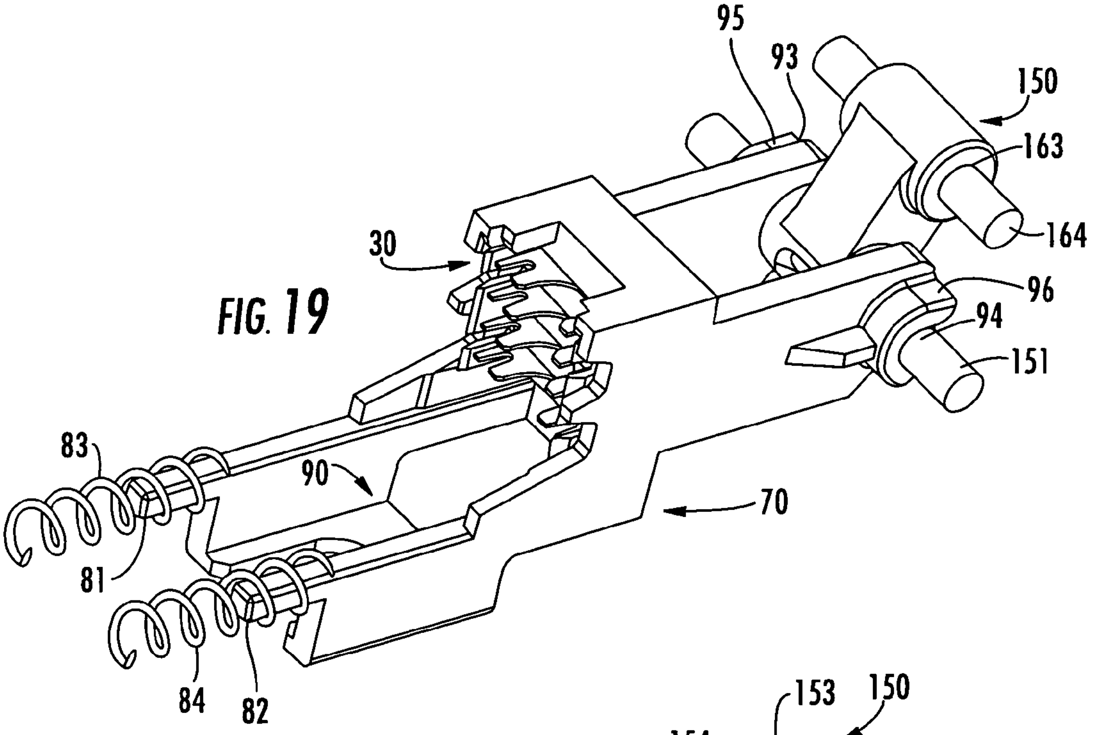
FIG. 19 is a perspective partial assembly view showing the blade carrier and link member for first embodiment of the multi-wire seating and cutting tool of the invention.
Figure 20:
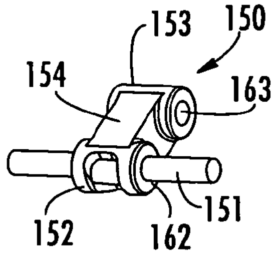
FIG. 20 is a perspective view of a link member for the multi-wire seating and cutting tool of the invention.

As shown in the partial assembly views of FIGS. 18 and 19, and the perspective views of FIGS. 20 and 21 one of these dowels, shown at 151, is retained by a link member 150. The link member 150 includes a pair of cylindrically configured end portions 152 and 153, that are parallel with each other and are connected by body portion 154 therebetween. Cylindrical end portion 152 has a bore 162 into which the dowel 151 is press fit, while cylindrical end portion 153 of the link member 150 has a bore 163, which is adapted to receive a pin 164, that is sized to pass through a pair of associated coaxial bores in the tool's trigger mechanism, so as to pivotally interconnect the trigger with the link member 150, as will be described below with reference to FIGS. 22–25.

Figure 22:
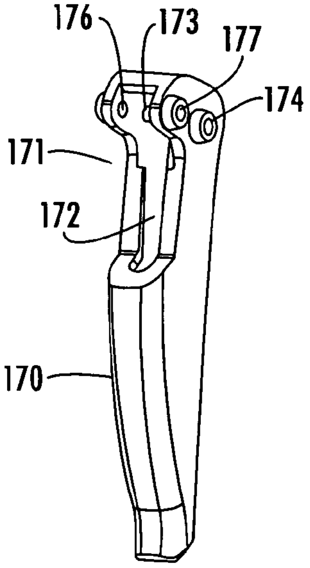
FIG. 22 is a perspective front view of the trigger mechanism for the multi-wire seating and cutting tool of the invention.
Figure 23:
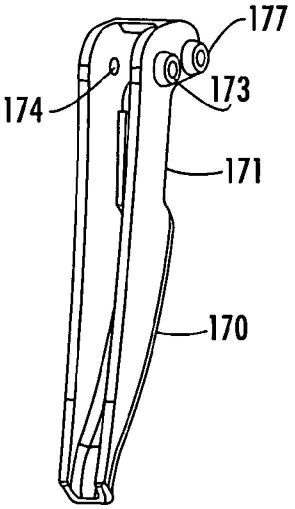
FIG. 23 is a perspective rear view of the trigger mechanism shown in FIG. 22.
Figure 24:
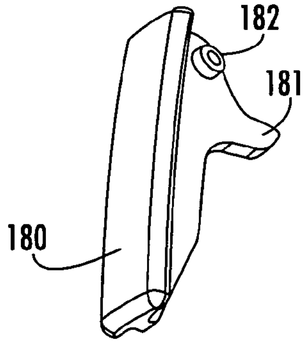
FIG. 24 is a perspective view of the handle of the wire termination tool of the invention.
Figure 25:
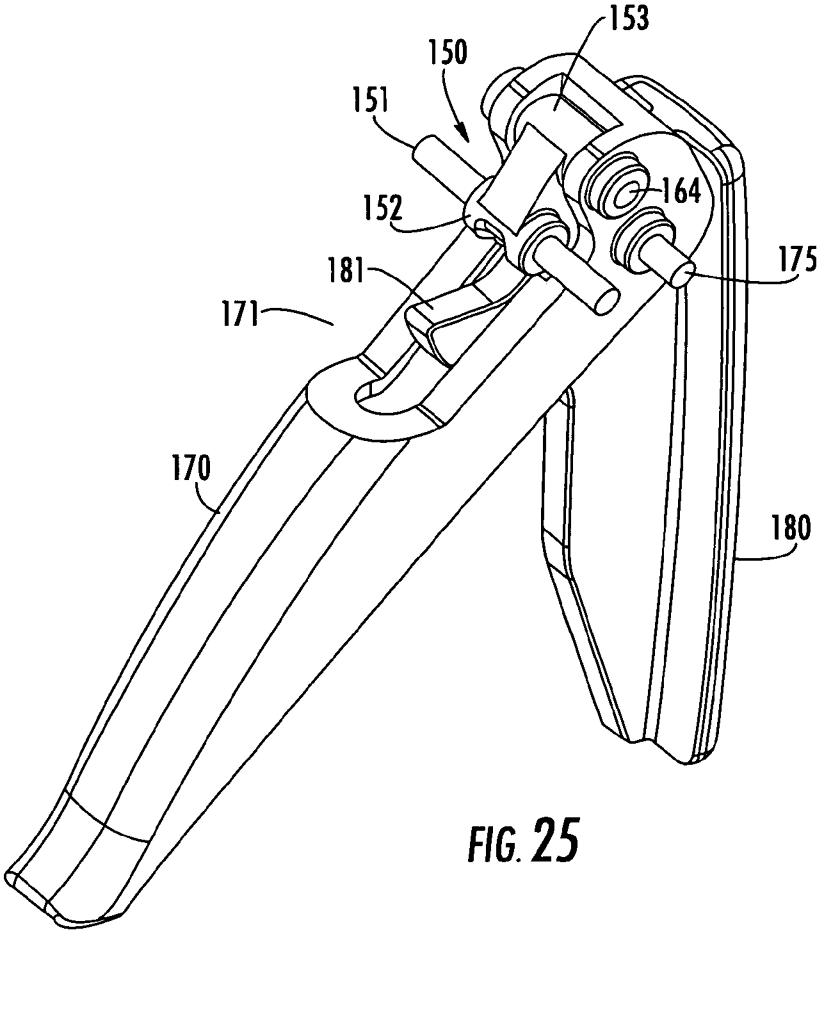
FIG. 25 is a perspective view of a trigger-handle assembly for the wire termination tool of the invention.

As further illustrated in the partial assembly view of FIG. 18, the dowel 151 rides on the dowel-guide portions 113 and 114 of the lower portion 100 of the support housing and, as also shown in FIG. 19, engages the circular tab portions 95 and 96 and the grooves 93 and 94 at the rear end of a blade head carrier 70, that has been installed in the lower portion 100 of the support housing. As a consequence, when the trigger mechanism is operated to rotate the link member 150, dowel pin 151 will be urged against the rear surface of the blade head carrier, so that the blade head carrier will be laterally translated toward the front end of the support housing. Then, with a multi-terminal jack having been placed in the generally U-shaped jack translation trough 90 at the forward end of the blade head carrier 70, the jack backstop 105 will prevent translation of the jack 10, as the blade head carrier 70 is pushed forward by the link member 150. This will allow the blade head 30 to engage the jack, so as to stuff and cut the wires that have been placed in the slots 14 of Attention is now directed to FIGS. 22 and 23, which are perspective front and rear views, respectively, of the trigger mechanism, and to FIG. 24, which is a perspective view of the handle of the wire termination tool of the invention. As shown in FIGS. 22 and 23, the trigger mechanism comprises a generally longitudinal body 170 (hereinafter referred to simply as trigger 170) having a recess 171 in an upper forward portion thereof. The recess 171 contains a slot 172 that is sized to accommodate a projection 181, which extends from an upper portion of a generally longitudinal handle 180, shown in FIG. 24. The handle 180 has a trigger pivot bore 182 that is sized to fit within the trigger's recess 171, so that it may be coaxially aligned with a pair of pivot bores 173 and 174 at the upper portion of the trigger 170 on opposite sides of the recess 171. As further shown in FIG. 25, when so aligned, bores 173 and 174 are adapted to receive a trigger pivot dowel 175 by way of which trigger 170 rotates relative to the handle 180. The upper portion of the trigger 170 further includes additional bores 176 and 177, which are adapted to be aligned with bore 163 in the cylindrical end portion 153 of the link member 150. This allows the pin 164 to pass through bores 176 and 177, thereby pivotally interconnecting the trigger mechanism with the link member 150.

Figure 26:
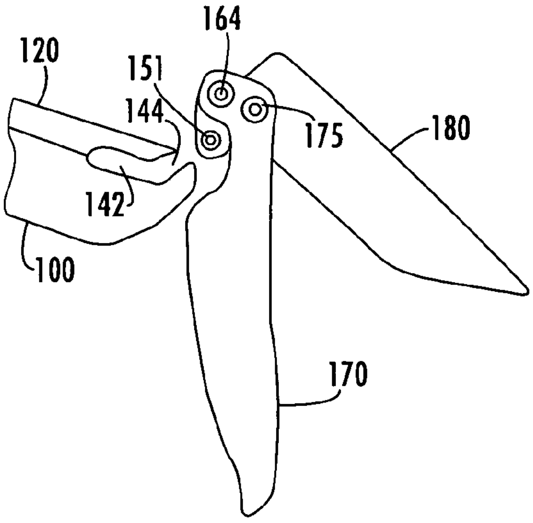
FIG. 26 is a composite side view of a portion of the support housing shown in the perspective view of FIG. 17 disposed adjacent to the trigger-handle assembly shown in the perspective view of FIG. 25.
Figure 27:
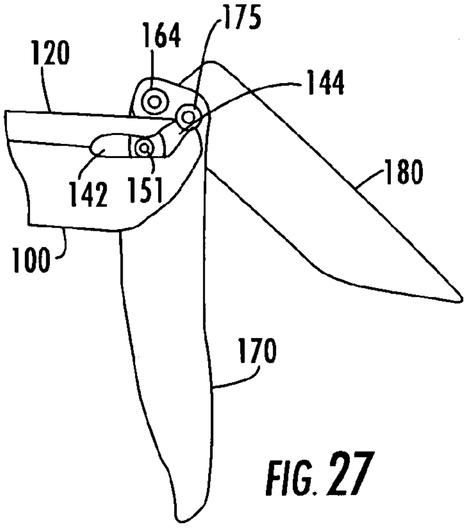
FIG. 27 is a diagrammatic side view showing the dowel of the link member engaging the dowel-guide channels of the support housing of the wire termination tool of the invention.
Figure 28:
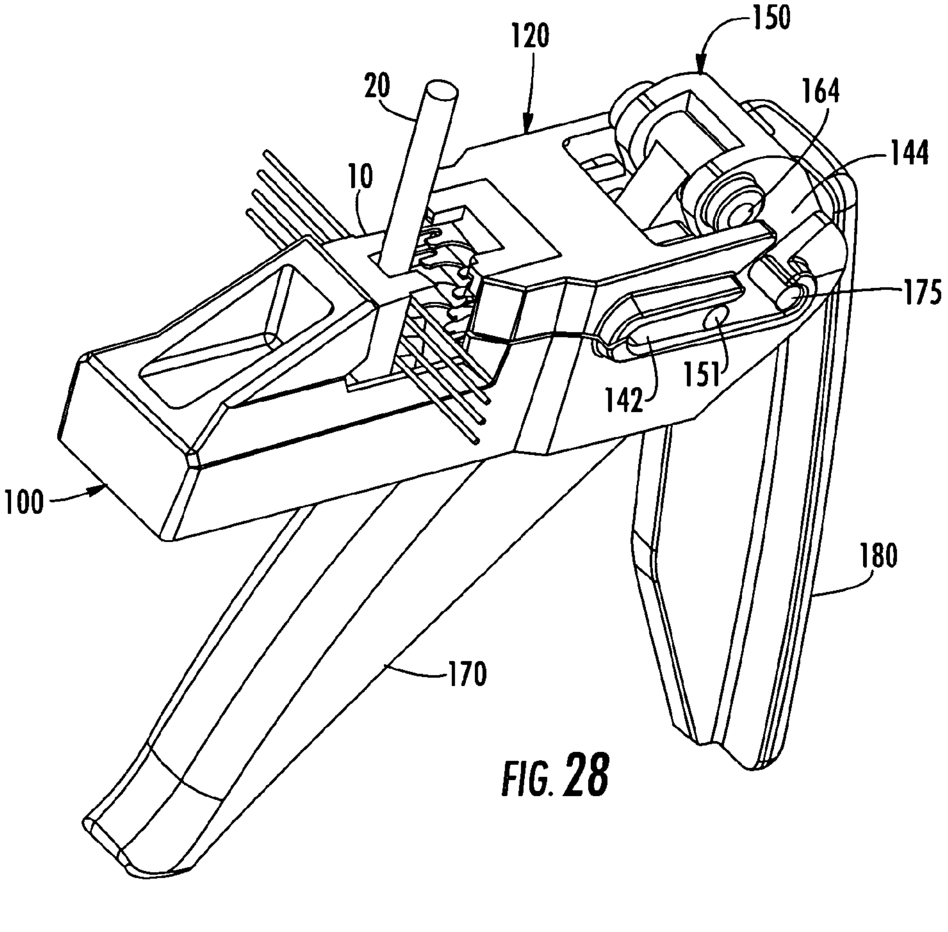
FIG. 28 is a perspective view of the first embodiment of the wire termination tool of the invention, in its 'ready-to-crimp' configuration, with dowels of the link member and the trigger inserted into the dowel-guide channels of the support housing.

The manner in which the trigger mechanism is inserted into the support housing is diagrammatically illustrated in FIGS. 26–28. In particular, FIG. 26 is a composite side view diagrammatically showing a portion of the support housing shown in FIG. 17 disposed adjacent to the pivotably interconnected trigger mechanism and handle shown in the perspective view of FIG. 25, such that the dowel 151 of link member 150 is adjacent to the gaps 143 and 144 between the respective upper and lower portions 120 and 100 of the support housing.

Next, the diagrammatic side view of FIG. 27 shows the link member dowel 151 inserted through the gaps 143 and 144 between the upper and lower portions of the support housing and riding in the support housing's dowel-guide channels 141 and 142. In addition, FIG. 27 shows the trigger 170 positioned such that its associated dowel 175 is located immediately adjacent to the gaps 143 and 144 of the support housing.

FIG. 28 is a perspective view showing dowel 175 having been inserted into the dowel-guide channels 141 and 142, so as to be captured against the partial circularly curved end portions 115 and 116 at the rear end 104 of the lower portion 100 of the support housing by the rearward directed bias force imparted by the compression springs 83 and, 84. With both dowels 151 and 175 now captured within the dowel-guide channels 141 and 142, squeezing the trigger 170 (toward the handle 180 and against the bias imparted by the compression springs 83 and 84) will rotate the trigger 170 toward the handle 180 around the axis of trigger pivot dowel 175. This rotation, in turn, rotates the upper portion of the trigger 170, and thereby its bores 176 and 177, and the link member pivot pin 164 therethrough in a forward direction toward the front end of the support housing. As a result, the dowel 151 is caused to ride along handle projection 181 and pushed forward along dowel-guide channels 141 and 142.

Since dowel 151 engages grooves 93 and 94 in the blade head carrier 70, squeezing the trigger 170 results in a forward translation of the blade head carrier 70 into crimping engagement with the jack 10 that has been inserted into the jack translation trough 90 at the forward end of the blade head carrier. Namely, squeezing the trigger 170 causes the blade head 30 to engage the jack, so as to stuff and cut the wires that have been placed in the slots 14 of the jack's lead frame carrier 12, as intended.

Once the wires have been seated and cut, release of the trigger 170 will allow compression springs 83 and 84 to return the blade head carrier 70 rearwardly along the support housing 100 to its original position, so that the jack may be removed from the tool. This rearward translation of the blade head carrier 70, in turn, causes a rearward translation of the link member dowel 151 within the dowel-guide channels 141 and 142 of the support housing, so as to rotate the trigger away from the handle.

As will be appreciated from the foregoing description, the present invention provides an improvement to the multi-wire stuffing and cutting tool of the type disclosed in the above-referenced '603 patent, by virtue of the invention's linearly translatable carrier, that contains a multi-blade cutting head, and is configured to slidably retain therein a multi-terminal jack, in which respective wires of a multi-wire cable have been inserted. Because the jack is continuously maintained in precision alignment with the cutting head, linear translation of the carrier within the support housing will bring the cutting blades of the translated blade head into precise wire-stuffing and cutting engagement with wires that have placed in the slots of the jack.

Now although the first embodiment of the invention shown in FIGS. 4–28, described above, fixes the jack and translates the blade head, it is to be understood that invention is not limited to this particular configuration, but is readily susceptible to alternative embodiments as would be apparent to a person skilled in the art, given the description herein. For example, pursuant to a first alternative embodiment of the invention, diagrammatically illustrated in FIGS. 29–31, the positions of the jack and blade head may be reversed relative to their positions in the embodiment of FIGS. 4–28.

Figure 29:
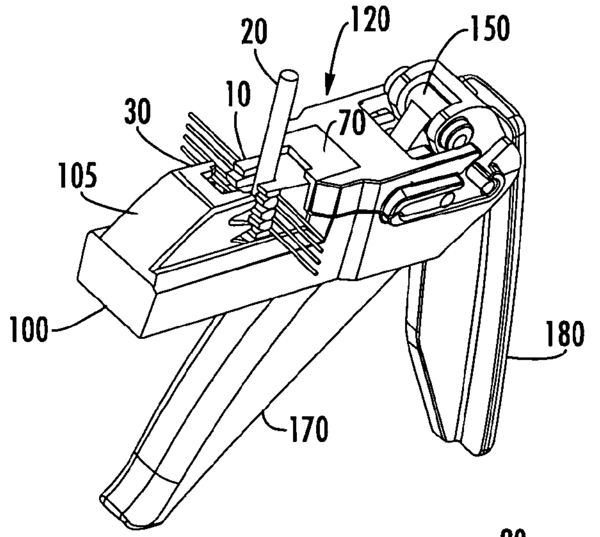
FIG. 29 is a front perspective view of a first alternative embodiment of the wire termination tool of the invention, wherein the positions of the jack and the blade head are reversed relative to their positions shown in the embodiment of FIGS. 4–28
Figure 30:
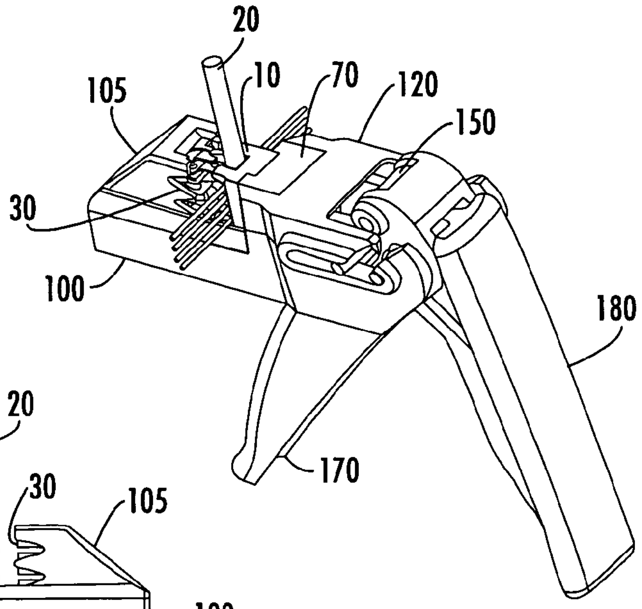
FIG. 30 is a rear perspective view of the first alternative embodiment of the wire termination tool of the invention shown in FIG. 29.
Figure 31:
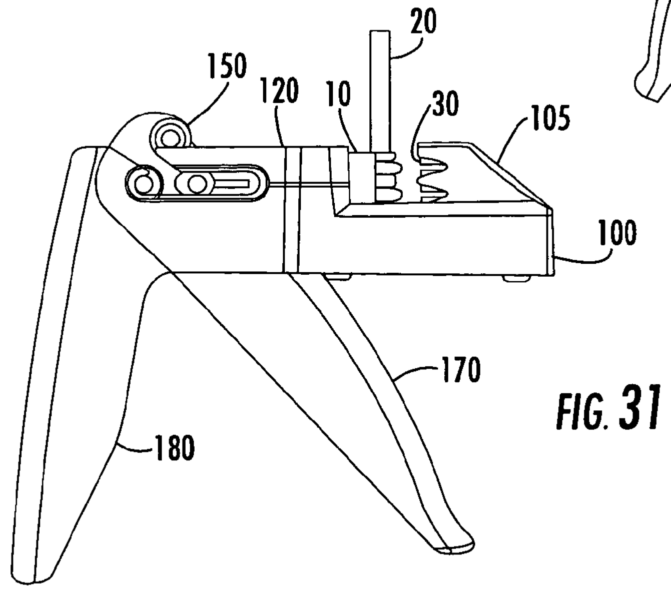
FIG. 31 is a diagrammatic side view of the first alternative embodiment of the wire termination tool of the invention shown in FIG. 29.

In particular, the perspective views of FIGS. 29 and 30 and the side view of FIG. 31 show the blade head 30 retained in a fixed position in the lower portion 100 of the support housing adjacent to the backstop 105, while the jack 10, which is to be translated, is captured by the translatable carrier 70. As a result, when the trigger 170 is squeezed toward the handle 180, it is the jack 10 that is linearly translated by the carrier 70 into crimping engagement with the stuffing and cutting blades of the fixed blade head 30.

Figure 32:
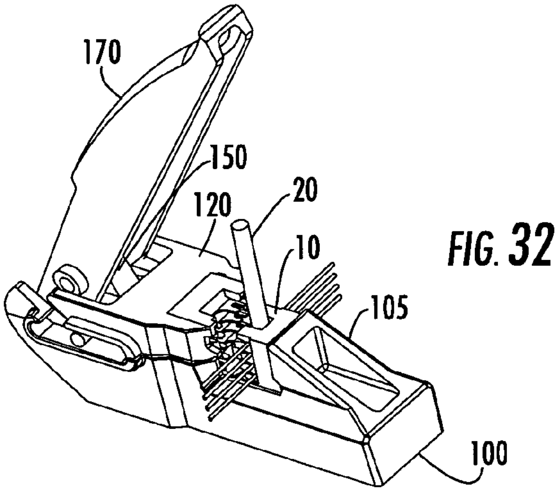
FIG. 32 is a front perspective view of a second alternative embodiment of the wire termination tool of the invention, which dispenses with the handle of the embodiments of FIGS. 4–31, and wherein forward movement of the link member and carrier to crimp and cut the wires is achieved by pushing down on the trigger.
Figure 33:
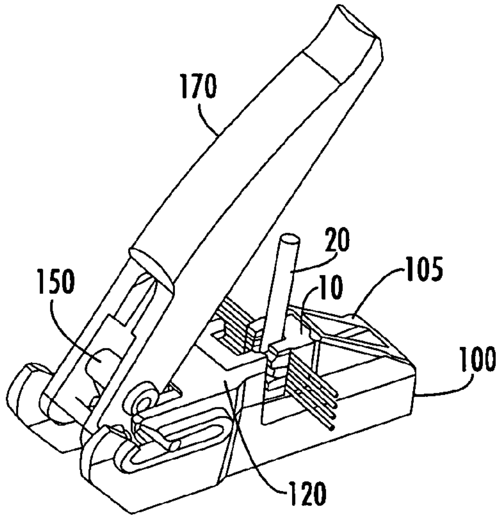
FIG. 33 is a rear perspective view of the second alternative embodiment of the wire termination tool shown in FIG. 32.
Figure 34:
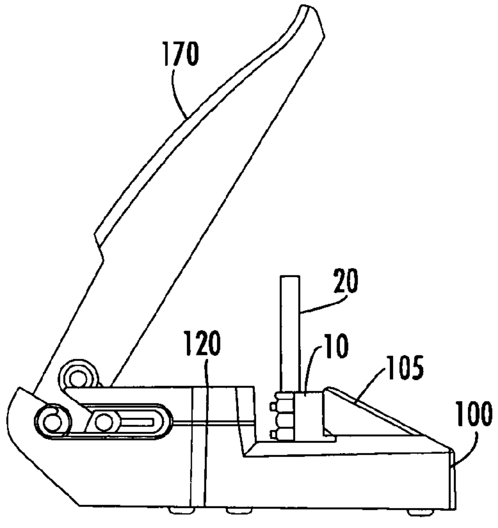
FIG. 34 is a side view of the second alternative embodiment of the wire termination tool shown in FIGS. 32 and 33.

Pursuant to a second alternative embodiment of the invention, diagrammatically illustrated in the front perspective view of FIG. 32, the rear perspective view of FIG. 33 and the side view of FIG. 34, the handle 180 of the embodiments of FIGS. 4–31 is not employed. Instead, the trigger 170 is rotated so as to position it above the tool, as shown. Then, the trigger, together with the link member 150, are inserted into guide channels of the support housing from the top of the tool. In this alternative trigger configuration, forward movement of the link member 150 and thereby the carrier 70 to crimp and cut the wires is achieved by pushing down on the trigger 170 toward the front end of the tool.

Figure 35:
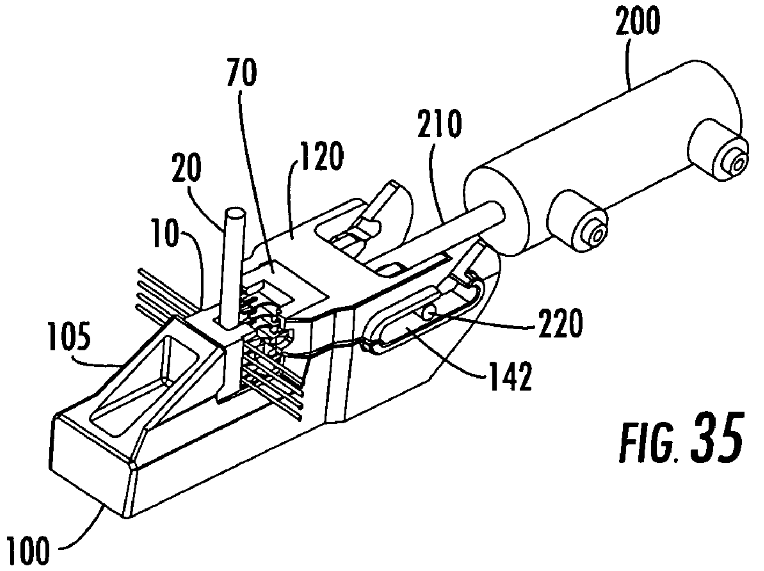
FIG. 35 is a front perspective view of a third alternative embodiment of the invention, wherein translation of the blade/jack carrier within the support member is achieved by means of a controllably energized displacement mechanism.
Figure 36:
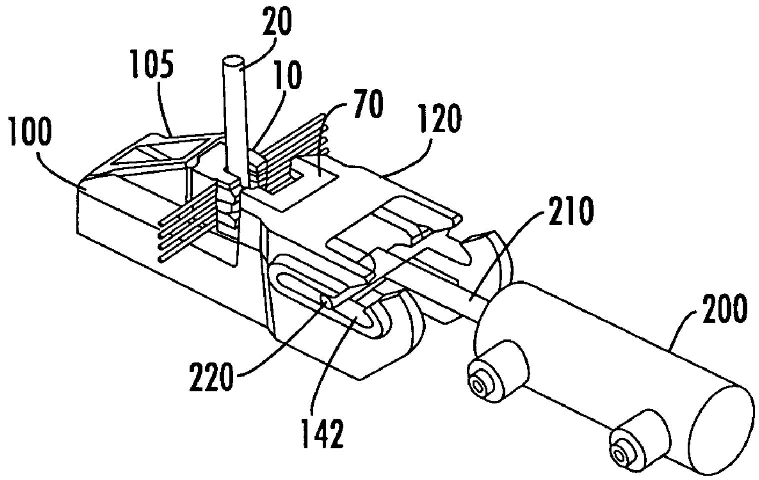
FIG. 36 is a rear perspective view of the third alternative embodiment of the invention shown in FIG. 35.
Figure 37:
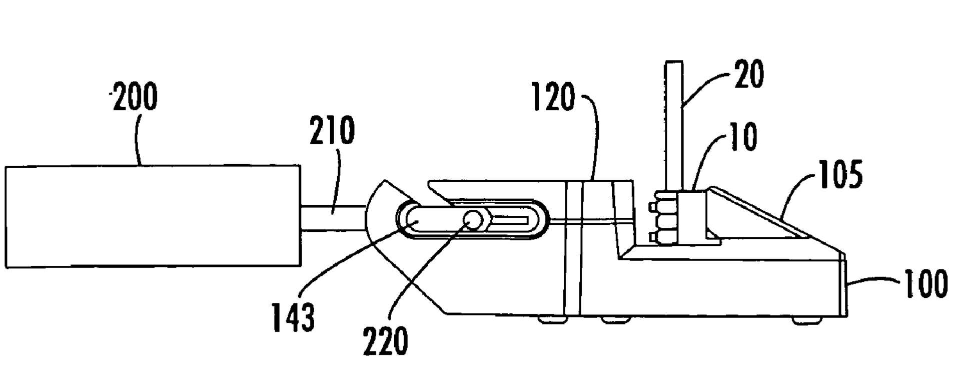
FIG. 37 is a side view of the third alternative embodiment of the invention shown in FIGS. 35 and 36.

In accordance with a third alternative embodiment of the invention, diagrammatically illustrated in the front perspective view of FIG. 35, the rear perspective view of FIG. 36 and the side view of FIG. 37, none of the link member 150, trigger 170, and handle 180 of the embodiments of FIGS. 4–34 is used. Instead, translation of the blade/jack carrier 70 within the support housing is achieved by means of a controllably energized displacement mechanism 200. Such a mechanism may comprise, but is not limited to, a pneumatic, hydraulic or electrically driven displacement mechanism, having a linearly translatable output shaft 210. A distal end of the output shaft 210 has a transverse dowel member 220, that rides in the channels 142 and 143 of the support housing, and is arranged to engage the grooves 93 and 94 in the blade head carrier 70. As a result, when the displacement mechanism is energized to displace the output shaft 210 toward the front of the tool, this action, in turn, will displace the carrier 70 forward, so as to bring the blade head into stuffing and cutting engagement with the wires of the jack.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A tool for seating and cutting multiple wires in associated terminals of a multi-terminal jack comprising:

a blade head carrier having a wire-seating and cutting blade head affixed therein and being configured to receive and support said multi-terminal jack therein, while providing for aligned linear translation of said blade head relative to said multi-terminal lack as said blade head carrier is translated;

a support housing for said blade head carrier that is configured to support said blade head carrier for linear translation therein, while retaining said multi-terminal jack in a fixed position and aligned with said blade head, as said blade head carrier is linearly translated in said support housing and brings said wire-seating and cutting blades of said cutting blade head into aligned engagement with said multi-terminal lack; and a blade head carrier translation mechanism, which is coupled to said blade head carrier, and is operative to linearly translate said blade head carrier relative to said support housing and toward said multi-terminal jack that has been placed in said blade head carrier, so as to be aligned thereby with said cutting blade head, while being retained in said fixed position by said support housing, so as to bring said wire-seating and cutting blades of said wire-seating and cutting blade head into aligned wire-seating and cutting engagement with wires that have been inserted into said multi-terminal jack.

2. The tool according to claim 1, wherein said blade head carrier translation mechanism comprises a trigger and handle mechanism coupled to said blade head carrier and to said support housing, and being operative, in response to said trigger being translated relative to said handle, to translate said blade head carrier relative to said support housing, so as to bring said wire-seating and cutting blade head into wire-seating and cutting engagement with said multi-terminal jack.

3. The tool according to claim 2, wherein said support housing includes a pair of guide channels on opposite sides thereof, which are adapted to receive translatable components of said trigger and handle mechanism that engage said blade head carrier, and thereby translate said blade head carrier relative to said support housing, so as to bring said wire-seating and cutting blade head into wire-seating and cutting engagement with said multi-terminal jack.

4. The tool according to claim 1, wherein said blade head carrier is configured to slidably retain therein said multi-terminal jack, in which respective wires of multi-wire cable have been inserted, such that the jack is maintained in precision alignment with the cutting blade head, as said blade head carrier is linearly translated within said support housing.

5. The tool according to claim 4, wherein said blade head carrier includes a jack translation recess, which extends to a forward end of said blade head carrier, and is sized to accommodate and provide for linear translation therein of said multi-wire termination jack.

6. The tool according to claim 5, wherein said blade head carrier is removably installable in said support housing, and further comprising a bias spring arrangement for biasing said blade head carrier toward a rear portion of said support housing containing said blade head carrier translation mechanism.

7. The tool according to claim 3, wherein said trigger and handle mechanism comprises a handle having a first bore adjacent to one end thereof, a trigger having first and second bores adjacent to one end thereof, said first bores being coaxial with one another and receiving a first dowel therethrough, a link member having first and second spaced apart dowels having parallel axes of rotation, said first dowel of said link member being inserted into and riding in a pair of channels on opposite sides of said support housing, and wherein said second dowel of said link member is coaxial with and passes through said second bore of said trigger.

8. The tool according to claim 7, wherein said first dowel through said first bore of said handle is adapted to be inserted into said pair of channels on opposite sides of said support housing, so as to provide for rotation of said trigger relative to said handle about the axis of said first dowel through said first bores of said handle and trigger.

9. The tool according to claim 8, wherein said handle includes a projection that passes through a slot in said trigger adjacent to said first dowel of said link member.

10. The tool according to claim 9, wherein said trigger contains a recess that is sized to accommodate said first dowel of said link member.

11. The tool according to claim 3, wherein said support housing comprises a lower support housing portion that is configured to removably support said blade head carrier for translation therein, while retaining said multi-terminal jack in said fixed position as said blade head carrier is translated in said lower support housing portion, and an upper support housing portion adjoining said lower support housing portion and forming said channels with said lower support housing portion.

12. The tool according to claim 11, wherein said upper support housing portion adjoins said lower support housing portion adjacent to said blade head of said blade head carrier.

13. A tool for seating and cutting multiple wires in associated terminals of a multi-terminal jack comprising a support housing, a linearly translatable blade head carrier, which is removably insertable into said support housing, said blade head carrier containing a multi-blade wire-seating and cutting head and being configured to slidably retain therein said multi-terminal jack in which respective wires of a multi-wire cable have been inserted, while providing for aligned linear translation of said blade head relative to said multi-terminal jack as said carrier is translated, such that said jack is maintained in precision alignment with said blade head as said blade head is linearly translated toward said multi-terminal lack that has been placed in said blade head carrier and is held in a fixed position by said support housing, as said blade head carrier is linearly translated within said support housing, and wherein translation of said blade head carrier is effected by a trigger and handle mechanism which is coupled to said support housing in a manner that pushes and thereby linearly translates said blade head carrier toward and against said jack, as held in said fixed position by said support housing, so as to bring seating and cutting blades of the translated blade head into precise wire-seating and cutting engagement with wires that have placed in wire-insertion slots of said jack.

14. The tool according to claim 13, further comprising a bias spring arrangement for biasing said blade head carrier toward a rear portion of said support housing containing said trigger and handle mechanism.

15. The tool according to claim 13, wherein said trigger and handle mechanism comprises a handle having a first bore adjacent to one end thereof, a trigger having first and second bores adjacent to one end thereof, said first bores being coaxial with one another and receiving a first dowel therethrough, a link member having first and second spaced apart dowels having parallel axes of rotation, said first dowel of said link member being inserted into and riding in a pair of channels on opposite sides of said support housing, and wherein said second dowel of said link member is coaxial with and passes through said second bore of said trigger.

16. The tool according to claim 15, wherein said first dowel through said first bore of said handle is adapted to be inserted into said pair of channels on opposite sides of said support housing, so as to provide for rotation of said trigger relative to said handle about the axis of said first dowel through said first bores of said handle and trigger.

17. A tool for seating and cutting multiple wires in associated terminals of a multi-terminal jack comprising: a translatable carrier that is adapted to retain one of a multi-terminal jack and a wire-seating and cutting blade head in a fixed position therein, and being configured to receive and support the other of said multi-terminal jack and said wire-seating and cutting blade head such that said one of said multi-terminal jack and said blade head is translatable by said carrier relative to the other of said multi-terminal jack and said blade head; a support housing for said carrier that is configured to support said carrier for translation therein, while retaining said other of said wire-seating and cutting blade head and said multi-terminal jack in a fixed position as said carrier is translated in said support housing; and a carrier translation mechanism, which is coupled to said carrier and is adapted to translate said carrier relative to said support housing, so as to bring said multi-terminal jack into wire-seating and cutting engagement with said wire-seating and cutting blade head.

18. The tool according to claim 17, wherein said one of said wire-seating and cutting blade head and said multi-terminal jack corresponds to said wire-seating and cutting blade head and said other of said wire-seating and cutting blade head and said multi-terminal jack corresponds to said multi-terminal jack.

19. The tool according to claim 17, wherein said one of said wire-seating and cutting blade head and said multi-terminal jack corresponds to said multi-terminal jack, and said other of said wire-seating and cutting blade head and said multi-terminal jack corresponds to said wire-seating and cutting blade head.

20. The tool according to claim 17, wherein said carrier translation mechanism comprises a trigger and handle mechanism coupled to said carrier and to said support housing, and being operative, in response to said trigger being translated relative to said handle, to translate said carrier relative to said support housing, so as to bring said wire-seating and cutting blade head into wire-seating and cutting engagement with said multi-terminal jack.

21. The tool according to claim 17, wherein said carrier translation mechanism comprises a trigger and link member mechanism coupled to said carrier and to said support housing, and being operative, in response to said trigger being rotated relative to said support housing, to translate said carrier so as to bring said wire-seating and cutting blade head into wire-seating and cutting engagement with said multi-terminal jack.

22. The tool according to claim 17, wherein said carrier translation mechanism comprises a controllably energized displacement mechanism having a linearly translatable output shaft, a distal end of which is arranged to engage said carrier, so that when said displacement mechanism is energized to displace said output shaft in a first direction, such displacement will translate said carrier so as to bring said wire-seating and cutting blade head into wire-seating and cutting engagement with said multi-terminal jack.

23. A tool for seating and cutting multiple wires in associated terminals of a multi-terminal jack comprising:

a blade head carrier having a wire-seating and cutting blade head affixed therein and a jack translation recess extending between said cutting blade head and a forward end of said blade head carrier, said jack translation recess having a floor upon which said multi-terminal jack is placed, and sidewalls that are shaped to intimately conform with and guide said multi-terminal jack into aligned engagement with wire-seating and cutting blades of said cutting blade head, as said blade head is linearly translated by said blade head carrier relative to said multi-terminal jack;

a support housing for said blade head carrier that is configured to support said blade head carrier for linear translation therein, while retaining said multi-terminal jack in a fixed position and aligned with said blade head, as said blade head carrier is linearly translated in said support housing and brings said wire-seating and cutting blades of said cutting blade head into aligned engagement with said multi-terminal jack; and a blade head carrier translation mechanism, which is coupled to said blade head carrier, and is operative to linearly translate said blade head carrier relative to said support housing and toward said multi-terminal jack that has been placed in said jack translation recess of said blade head carrier, so as to be aligned thereby with said cutting blade head, while being retained in said fixed position by said support housing, so as to bring said wire-seating and cutting blades of said wire-seating and cutting blade head into aligned wire-seating and cutting engagement with wires that have been inserted into said multi-terminal jack.

24. The tool according to claim 23, wherein said blade head carrier translation mechanism comprises a trigger and handle mechanism coupled to said blade head carrier and to said support housing, and being operative, in response to said trigger being translated relative to said handle, to translate said blade head carrier relative to said support housing, so as to bring said wire-seating and cutting blade head into wire-seating and cutting engagement with said multi-terminal jack.

25. The tool according to claim 24, wherein said support housing includes a pair of guide channels on opposite sides thereof, which are adapted to receive translatable components of said trigger and handle mechanism that engage said blade head carrier, and thereby translate said blade head carrier relative to said support housing, so as to bring said wire-seating and cutting blade head into wire-seating and cutting engagement with said multi-terminal jack.

26. The tool according to claim 25, wherein said support housing comprises a lower support housing portion that is configured to removably support said blade head carrier for translation therein, while retaining said multi-terminal jack in said fixed position as said blade head carrier is translated in said lower support housing portion, and an upper support housing portion adjoining said lower support housing portion and forming said channels with said lower support housing portion.

27. The tool according to claim 26, wherein said trigger and handle mechanism comprises a handle having a first bore adjacent to one end thereof, a trigger having first and second bores adjacent to one end thereof, said first bores being coaxial with one another and receiving a first dowel therethrough, a link member having first and second spaced apart dowels having parallel axes of rotation, said first dowel of said link member being inserted into and riding in a pair of channels on opposite sides of said support housing, and wherein said second dowel of said link member is coaxial with and passes through said second bore of said trigger.

28. The tool according to claim 27, wherein said first dowel through said first bore of said handle is adapted to be inserted into said pair of channels on opposite sides of said support housing, so as to provide for rotation of said trigger relative to said handle about the axis of said first dowel through said first bores of said handle and trigger.

29. The tool according to claim 28, wherein said handle includes a projection that passes through a slot in said trigger adjacent to said first dowel of said link member.

30. The tool according to claim 29, wherein said trigger contains a recess that is sized to accommodate said first dowel of said link member.

* * * * *

UNITED STATES PATENT AND TRADEMARK OFFICE
CERTIFICATE OF CORRECTION

PATENT NO. : 7,073,245 B2 
APPLICATION NO. : 10/845930
DATED : July 11, 2006
INVENTOR(S) : Paul John Alexander and Michael M. Fallandy It is certified that error appears in the above-identified patent and that said Letters Patent is hereby corrected as shown below:

| | |
|---|---|
| Column 1, Line 43 | Delete: "the cutting-head"<br>Insert: --the cutting head-- |
| Column 3, Line 40 | Delete: "of the of sidewalls"<br>Insert: --of the sidewalls-- |
| Column 4, Line 35 | Delete: "ready for used,"<br>Insert: --ready for use,-- |
| Column 9, Line 27 | Delete: "of the support,"<br>Insert: --of the support-- |
| Column 10, Line 3 | Delete: "14 of"<br>Insert: --14 of the jack's lead frame carrier 12.-- |
| Column 10, Line 51 | Delete: "springs 83 and, 84."<br>Insert: --springs 83 and 84.-- |
| Column 11, Line 29 | Delete: "understood that invention"<br>Insert: --understood that the invention-- |
| Column 12, Line 25 | Delete: "multi-terminal lack"<br>Insert: --multi-terminal jack-- |
| Column 12, Line 34 | Delete: "multi-terminal lack; and"<br>Insert: --multi-terminal jack; and-- |

UNITED STATES PATENT AND TRADEMARK OFFICE

CERTIFICATE OF CORRECTION

PATENT NO. : 7,073,245 B2

APPLICATION NO. : 10/845930

DATED : July 11, 2006

INVENTOR(S) : Paul John Alexander and Michael M. Fallandy

It is certified that error appears in the above-identified patent and that said Letters Patent is hereby corrected as shown below:

Column 13, Line 62 Delete: “said multi-terminal lack”
Insert: --said multi-terminal jack--

Signed and Sealed this

Twenty-first Day of November, 2006

JON W. DUDAS

*Director of the United States Patent and Trademark Office*